(12) United States Patent
Tatry

(10) Patent No.: US 8,727,299 B2
(45) Date of Patent: May 20, 2014

(54) ASSEMBLY FOR AN AIRCRAFT, THE ASSEMBLY INCLUDING AT LEAST ONE VIBRATION DAMPER

(75) Inventor: Philippe Tatry, Balma (FR)

(73) Assignee: Airbus (S.A.S.), Blagnac (FR)

( * ) Notice: Subject to any disclaimer, the term of this patent is extended or adjusted under 35 U.S.C. 154(b) by 259 days.

(21) Appl. No.: 13/243,107

(22) Filed: Sep. 23, 2011

(65) Prior Publication Data

US 2012/0085881 A1  Apr. 12, 2012

(30) Foreign Application Priority Data

Oct. 6, 2010 (FR) ...................................... 10 58097

(51) Int. Cl.
    *F16M 13/00* (2006.01)
(52) U.S. Cl.
    USPC .......... 248/636; 244/173.2; 267/81; 977/902; 977/848
(58) Field of Classification Search
    USPC .................. 248/636; 977/902, 750, 752, 848;
                       244/173.2; 267/80, 81, 136, 160, 179
    See application file for complete search history.

(56) References Cited

U.S. PATENT DOCUMENTS

| | | | |
|---|---|---|---|
| 3,130,964 A * | 4/1964 | Johnson | 267/152 |
| 6,764,628 B2 * | 7/2004 | Lobovsky et al. | 264/172.15 |
| 7,016,189 B2 * | 3/2006 | Lin | 361/679.34 |
| 7,191,997 B2 * | 3/2007 | Bremmon et al. | 248/559 |
| 7,471,509 B1 * | 12/2008 | Oliver | 361/679.33 |
| 7,688,577 B2 * | 3/2010 | Wang | 361/679.35 |
| 8,253,209 B2 * | 8/2012 | Parbaud et al. | 257/415 |
| 2006/0255517 A1 * | 11/2006 | Lee et al. | 267/148 |
| 2008/0074026 A1 * | 3/2008 | Sakai et al. | 313/309 |
| 2008/0283269 A1 * | 11/2008 | Graham et al. | 174/98 |
| 2009/0013792 A1 * | 1/2009 | Qiao et al. | 73/723 |
| 2010/0013034 A1 * | 1/2010 | Parbaud et al. | 257/415 |
| 2010/0193305 A1 | 8/2010 | Suciu | |
| 2010/0282496 A1 * | 11/2010 | Landi et al. | 174/133 R |
| 2011/0069860 A1 * | 3/2011 | Liu et al. | 381/413 |

FOREIGN PATENT DOCUMENTS

| | | |
|---|---|---|
| DE | 10 2008 035 913 A1 | 2/2010 |
| EP | 0 639 500 B1 | 4/1998 |
| WO | WO 2008136787 A2 * 11/2008 | ............. G01N 27/12 |
| WO | WO 2010/059198 A1 | 5/2010 |

OTHER PUBLICATIONS

French Preliminary Search Report dated May 30, 2011 issued in French Patent Application No. 1058097 (with translation).

* cited by examiner

*Primary Examiner* — Terrell McKinnon
*Assistant Examiner* — Daniel J Breslin
(74) *Attorney, Agent, or Firm* — Oliff PLC

(57) ABSTRACT

The assembly for an aircraft comprises:
  at least one device;
  a part such as a support; and
  at least one damper via which the device bears against the part, the damper comprising carbon nanotubes covered at at least one of their ends by a layer having a diamond type crystal structure.

15 Claims, 2 Drawing Sheets

ASSEMBLY FOR AN AIRCRAFT, THE ASSEMBLY INCLUDING AT LEAST ONE VIBRATION DAMPER

FIELD OF THE INVENTION

The invention relates to aircraft.

BACKGROUND OF THE INVENTION

Systems on board airplanes (computers, screens, power electronics devices, valves, actuators, . . . ) are subjected to numerous vibratory phenomena, e.g. generated by the engines, the stream of air flowing over the airplane, and by running along the ground during takeoff and landing, to mention only a few examples. Throughout the present application, it should be understood that the vibratory phenomena may in particular be of an acoustic nature. These vibratory phenomena are heterogeneous in terms of frequency and amplitude and they depend on the stage of utilization or of flight (taxiing, takeoff, climbing, cruising, descending, landing, etc.), on air flow conditions (in-flight turbulence, etc.), and on the zones involved on board the airplane. Furthermore, systems of the "rotary machine" type (electric motors, fluid pumps, etc.) generate analogous vibratory phenomena that propagate through the airplane to other systems and to its structures, etc.

These vibratory phenomena are characterized by the type of the vibration (e.g. sinusoidal, random, transient), the associated spectra (in time and in frequency), resonance phenomena, etc. They have an impact on systems by reducing the lifetimes of mechanical parts, of electronics cards, of electronic components, and of structures, since the vibration subjects them to cycling and to fatigue. Amongst the effects that are induced thereby is a reduction in system reliability and an increase in preventative and/or corrective maintenance tasks.

A vibratory environment is characterized by its spectrum, which represents a parameter (amplitude, acceleration, etc.) as a function of the frequency of the signal. The spectrum may either be continuous, as applies to transient and random signals, or discontinuous or discrete as applies to harmonic or periodic signals, etc.

To mitigate vibration, attempts are made to absorb or to damp levels of vibration, which attempts consist in reducing the capacity of vibration to propagate and dissipate its energy. For this purpose, an absorber or damper presents a phenomenon of hysteresis in the dynamic elasticity relationship between stresses and strains. The vibratory environment may be improved by dissipating mechanical energy in three different ways, sometimes simultaneously.

It is possible to use a viscous fluid in which energy is dissipated in proportion to the speed of vibration, the fluid filling a reservoir in which a movable piston is immersed. However that dissipation gives rise to the suspension stiffening progressively with increasing frequency, where such stiffening can be compensated by installing the damper in series with high frequency decoupling.

In another known solution, friction is generated on a macroscopic scale by creating relative movement between the components of the structure under the effect of vibration. With friction, the amount of energy that is dissipated is proportional to the relative vibratory movement, but there exists a threshold effect. Under such circumstances, the system constitutes a significant source of non-linearities and is effective only at low frequencies with stresses presenting a large relative amplitude. When the threshold for initiating relative sliding between the elements is no longer reached, the elements allow vibratory stresses to pass through without being attenuated.

It is also possible to use the property of viscoelasticity, which is an intrinsic capacity of certain materials for dissipating vibratory energy. The dissipation of vibratory energy is then proportional to the vibratory acceleration. Under such circumstances, the molecular state of the material leads to its elasticity modulus and its shear modulus being represented mathematically in the form of complex numbers in which the real part corresponds to the elasticity of the material and the imaginary part represents its capacity for dissipation.

On board airplanes, the solutions presently implemented are based essentially on the following principles:

selecting locations for systems in zones that have acceptable levels of vibration. However these installation constraints are sometimes difficult to reconcile with other constraints, and they limit options in optimizing the design of the airplane and its systems;

adding mechanical parts to provide support and damping in a serial or parallel connection to provide passive control over the frequencies and the amplitudes of vibration on the systems. However such additional parts are often voluminous, they give rise to problems of aging over time, and they are sensitive to temperature, in particular when they are hybrid parts made both of rubber and of metal;

selecting components and assembly techniques that tolerate levels of vibration. However the resulting overdimensioning limits the options for optimizing systems installed on board an airplane; and appropriate maintenance, but that has the potential of giving rise to higher operating costs.

An object of the invention is to attenuate passively the levels of vibration on systems in order to improve their performance, lifetime, and maintenance.

OBJECT AND SUMMARY OF THE INVENTION

To this end, the invention provides an assembly for an aircraft, which assembly comprises:

at least one device;

a part such as a support; and at least one damper via which the device bears against the part, the damper comprising carbon nanotubes covered at least one of their ends by a layer having a diamond type crystal structure.

Nanotechnologies are techniques for designing and fabricating articles of size smaller than a few hundreds of nanometers ($10^{-9}$ meters (m)), and also applications that stem therefrom. A few orders of magnitudes for different scales are given below by way of comparison;

| Scale (order of magnitude) | Examples (biology) |
|---|---|
| 0.1 nanometers | Atom |
| 1 nanometer | Molecule |
| 10 nanometers | Protein |
| 100 nanometers | DNA |
| 1 micrometer | Cell |
| 10 to 100 micrometers | Hair |

As a function of the sizes of materials, their properties may be very different: thus, at nanometer scale, certain properties appear and others disappear, some are greatly improved while others are disturbed or attenuated. In particular, the characteristics of materials are modified under the effect of a very significant increase in specific surface areas and interfaces, an amplification of interactions between the materials, and a confinement effect. These various effects may also be combined.

Amongst the properties affected by the size effect on going to nanometric scale, there are properties of passively absorbing environmental vibration. Thus, nanomaterial dampers provide a solution that is particularly effective and that provides particularly good performance for systems on board aircraft that would otherwise be subjected to levels of vibration putting constraints on performance, lifetime, and maintenance, or indeed generating vibration levels that are harmful for other devices of the aircraft. Such dampers form passive elements that are installed at the interfaces between systems and their supports or the overall structure. A damper may comprise one or more nanomaterials.

The principal benefits and advantages associated with nanomaterial dampers lie in the passive attenuation of vibroacoustic levels on systems (be they electrical, electronic, fluidic, or mechanical, in particular), essentially when there are severe requirements in terms of lifetime. The advantages for an aircraft are as follows:

a reduction in the constraints on installing systems, thereby enabling the installation of systems in an aircraft to be optimized better;

the capacity to use technical components for assembly that are less demanding in terms of ability to withstand vibration levels, thereby reducing costs and providing better management over component obsolescence, etc.; and reducing maintenance tasks, and thus reducing operating costs.

The properties of nanomaterials for passively absorbing a vibratory environment are associated, for example, with surface effects such as absorbing fluid in porous solids.

They may also be mechanical and associated with elasticity. However attenuation is effective only on the condition that the material presents criteria of great compressibility, considerable elasticity, and surfaces that are hard and that present little friction. In order to satisfy these various criteria, it is possible to use hybrid materials, with each material providing its contribution to one or more of the criteria. Certain nanomaterials enable such hybridization to be performed at nanometric scale, thereby greatly increasing properties for passive attenuation of levels in the vibratory environment.

These materials include carbon nanotubes covered in a carbon surface having a diamond type structure. Such hybrid materials, also known as "nanomattresses", withstand mechanical wear and chemical attack and they are stable at high temperatures. These advantages are important for ensuring excellent performance in absorbing and damping vibration. The use of conventional viscoelastic materials (such as elastomers) is limited by the very nature of their dissipation mechanisms that appear only over a narrow range of temperatures and frequencies: the Young's modulus and the damping of an elastomer are very sensitive to these two parameters of temperature and frequency. It should be recalled that performance in terms of viscoelastic dissipation is at its maximum in the transition stage of a material passing from a rubbery state to a vitreous state. When the material is cold or at high frequencies, its molecular structure is in the vitreous state and therefore stiff. Conversely, when the material is hot or at low frequencies, it passes to the rubbery state, in which it is soft and has an increased tendency to creep. Furthermore, damping is at a maximum at the point of inflection in Young's modulus between those two states of being vitreous and rubbery. Generally, damping increases with increasing rapidity of the transition between those states. The nanotube assembly presents the advantage in terms of its effects of being insensitive to temperature and thus of being capable of being used in a severe thermal environment. It thus replaces hybrid mechanical parts for providing support and damping of the kind that are installed in a series or parallel assembly in order to provide passive control over the frequencies and amplitudes of vibration on systems.

In an embodiment, at least some of the nanotubes are of the single-sheet type.

In another embodiment, at least some of the nanotubes are of the multi-sheet type.

The carbon nanotube structure relies on rolling up a sheet of graphene about an axis. Nanotubes come in two major families:

single-sheet nanotubes present a single plane roll of graphene and have a diameter of the order of 0.5 nanometers to 2 nanometers and lengths that may be as much as one micrometer, or even up to millimetric lengths; and multisheet nanotubes are formed from a plurality of concentric tubes possessing diameters lying between one nanometer and several tens of nanometers and lengths that may extend up to about one hundred micrometers or even up to millimetric lengths.

A nanotube is characterized by its helicity, which is a function of the conditions in which the graphene sheet is wound. The value of the chiral vector and the diameter determine the shape of the carbon nanotube. Given the "length/diameter" ratio that is very large for carbon nanotubes (their specific surface area is large), their electrical, thermal, and mechanical properties are exceptional.

Advantageously, the nanotubes are covered at both ends by a layer having a diamond type crystal structure.

In an embodiment, the device comprises an electronic circuit having a substrate, the substrate carrying electronic components and being in contact with the part via the or each damper.

In another embodiment, the part is a first part and the device comprises at least two members and a second part connected to the members independently of each other and in contact with the first part via the or each damper.

Provision can be made for the device to be electrical, electronic, fluidic, and/or mechanical.

Finally, the invention provides an aircraft including an assembly of the invention.

BRIEF DESCRIPTION OF THE DRAWINGS

Other characteristics and advantages of the invention appear further from the following description of several embodiments given by way of non-limiting examples and with reference to the accompanying drawings, in which.

MORE DETAILED DESCRIPTION

Figure 1:
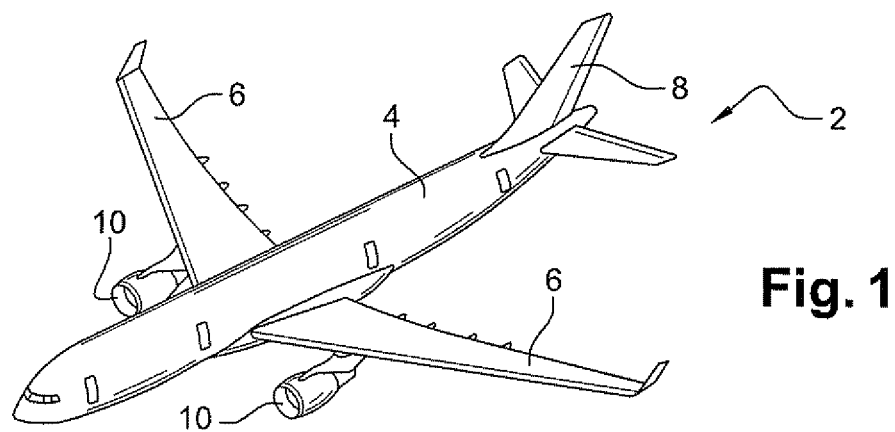
FIG. 1 is a perspective view of an airplane of the invention.

FIG. 1 shows an aircraft of the invention. In the present example it is an aerodyne, and specifically an airplane 2 having a fuselage 4 and two wings 6. It has a tail 8 and jets 10 secured to respective wings. It is an airplane for commercial transport of goods and/or one or more passengers. The airplane in this example is suitable for performing long-haul flights carrying at least 50 passengers or indeed at least 100 or 200 passengers, or freight. At the front of the fuselage 4 it includes a cockpit that is to be occupied by at least one person acting as the pilot.

The airplane 2 includes numerous on-board systems constituting the equipment needed to enable it to operate. One such system is formed by the device 12 shown in FIG. 3. In this example, the device 12 is generally in the form of a rectangular block, with this exemplary shape nevertheless not being limiting insofar as numerous other shapes could be envisaged for the device 12. The device is associated with an external part 14 that, in this example, forms a support for the device, which is rigidly fastened thereto. The device is mechanically connected to the structure of the airplane via the support.

The assembly formed by the device 12 and the support 14 also includes a plurality of mechanical connection elements 16 interposed between the device and its support. It is via these elements that the device comes into contact with the support 14 and is rigidly fastened thereto. Specifically there are four such elements 16. The elements 16 are arranged at the four corners of the face of the device that faces the support, and they are spaced apart from one another. The device extends at a distance from the support such that it is possible for air to flow between them.

Figure 3:
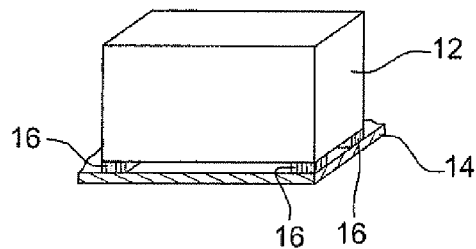
FIGS. 3 to 5 are three perspective views respectively showing three assemblies of the invention on board the airplane of FIG. 1.

The vibration produced by the device is attenuated by the dampers 16 such that little or no vibration is transmitted to the support 14 or to the part to which it is otherwise connected, and in particular the structure of the airplane. In the example of FIG. 3, a single device 12 is associated on its own with the dampers 16 in order to reduce the transmission of vibration to the support.

Figure 4:
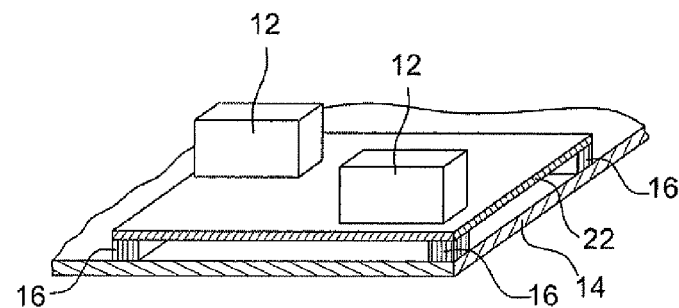

In the embodiment of FIG. 4, there can be seen the support 14. However in this example, there are a plurality of members 12 that are functionally independent of one another, for example there are two such members. The members are fastened independently of each other to a top face of a common intermediate support 22 that, in this example, is generally in the form of a flat rectangle lying in a plane. The intermediate support 22 is fastened to the main support 14 via a plurality of dampers 16 identical to the dampers of the first embodiment. The vibration produced by each of the members 12 is transmitted to the intermediate support 22 and then attenuated by the dampers 16 so that little or no vibration is transmitted to the support 14 and to the parts to which it is otherwise connected.

Figure 5:
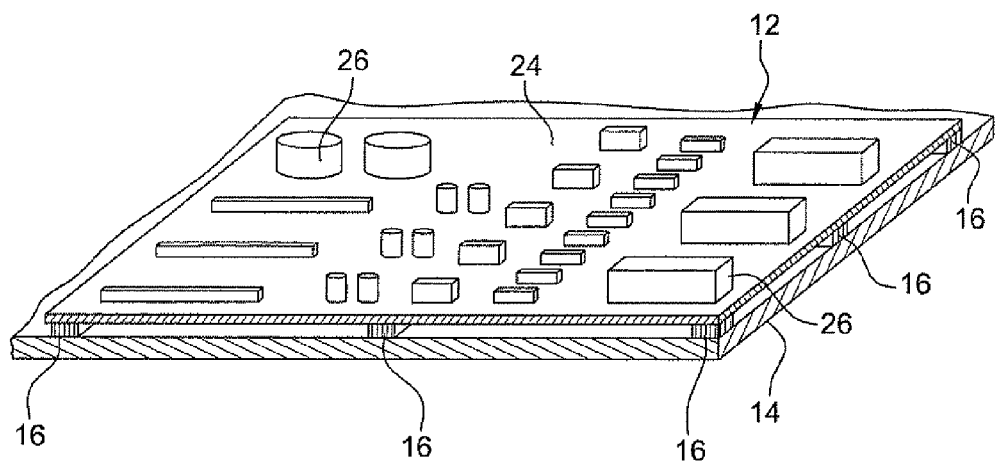

The embodiment of FIG. 5 is similar to that of FIG. 3. Specifically, the device 12 is constituted by an electronics card comprising a substrate 24 with electronic components 26 fastened on the top face thereof. At least some of the components are sensitive to vibration. The card is fastened to the support 14 via dampers 16, there being nine of them in this example. Specifically, these supports are located not only at the four corners of the rectangle formed by the card, but also in the middles of the four edges of the rectangle. The dampers prevent vibration in the environment of the card being transmitted to the card and to its components.

The structure of each element 16 that forms a nanomaterial damper is described below.

Figure 2:
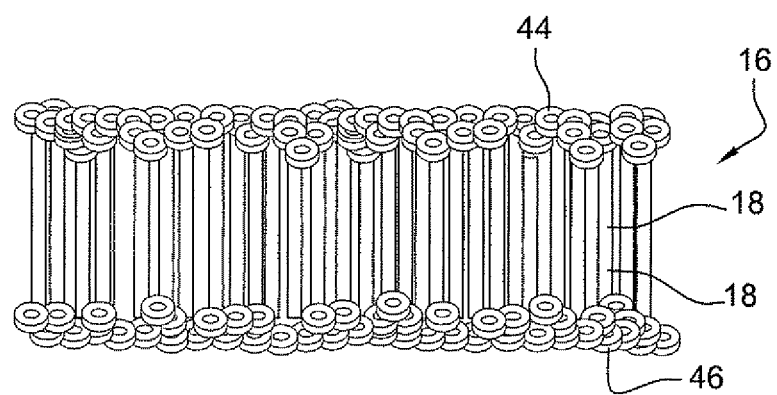
FIG. 2 is a section view of a nanotube damper used in the embodiments of FIGS. 3 to 5.

FIG. 2 shows an embodiment of the dampers 16. Each damper 16 comprises carbon nanotubes 18. Each nanotube is generally in the shape of a cylinder of circular section in a plane that is perpendicular to the longitudinal axis of the cylinder. The tubes are generally rectilinear. The nanotubes are arranged parallel to one another and in such a manner that their axes are parallel to the direction extending from the device 12 to the support 14 and locally perpendicular to the facing faces of the device and of the support.

The group of nanotubes is covered at each of its ends corresponding to the axial ends of the nanotubes by a respective layer 44, 46 of carbon having a diamond type crystal structure. The hard layer 44 provides the interface between the nanotubes and the device 12, and the other hard layer 46 provides the interface between the nanotubes and the support 14.

In such a hybrid material, the carbon nanotubes perform the mechanical elasticity function and the diamond type structure carbon layers provide the mechanical interface between the carbon nanotubes and their environment. It is advantageous to dimension the damper as a function of the type of vibration (e.g. sinusoidal, random, transient), of the associated spectra (in time and in frequency), and of resonance phenomena.

The invention serves to provide passive control of the vibro-acoustic environment of the device 12 by means of the dampers 16. The device in question may be any of the following systems: a fuel pump; a computer; a monitor; a power electronics device and/or a converter; fan; an air valve; a fuel valve; a valve for some other fluid; a data or voice recorder; an electrical master box; an actuator, e.g. a flight control; a position sensor; a lighting system; a navigation system; etc.

The invention may be used equally well for preventing the vibration generated by a device from propagating into its environment and for preventing vibration existing in the environment of a device from reaching that device. The invention may also be used by housing the damper inside a system, e.g. bearing against an inside face of a housing of the system and against some other element that is internal to the system.

Naturally, numerous modifications may be made to the invention without going beyond the ambit thereof.

The part 14 need not be a support for the device, for example it may be a part that is distinct from a support that is provided in some other way, and that is dedicated to damping vibration.

The invention claimed is:

1. A vibration damping assembly for an aircraft, the vibration damping assembly comprising:
   at least one device that enables the aircraft to operate;
   a part operable as a support for the at least one device;
   and at least one damper via which the device bears towards and against the part, the at least one damper comprising carbon nanotubes covered at least at one of their ends by a layer having a diamond type crystal structure, wherein
   all of the carbon nanotubes are arranged: i) parallel to one another, and ii) in such a manner so that their axes are completely parallel to a direction extending from the device to the part.

2. The vibration damping assembly according to claim 1, wherein the nanotubes are covered at both ends by a layer having a diamond type crystal structure.

3. The vibration damping assembly according to claim 1, wherein at least some of the nanotubes are of a single-sheet type.

4. The vibration damping assembly according to claim 1, wherein at least some of the nanotubes are of a multi-sheet type.

5. The vibration damping assembly according to claim 1, wherein the at least one device comprises an electronic circuit having a substrate, the substrate carrying electronic components and being in contact with the part via the at least one damper.

6. The vibration damping assembly according to claim 1, wherein the part is a first part and the device comprises at least two members and a second part connected to: i) the at least two members independently of each other, and ii) the first part via the at least one damper.

7. The vibration damping assembly according to claim 1, wherein the device is electrical and/or electronic.

8. The vibration damping assembly according to claim 1, wherein the device enables movement of a fluid.

9. The vibration damping assembly according to claim 1, wherein the device is mechanical.

10. An aircraft comprising:
   at least one device;
   a part operable as a support for the at least one device; and
   at least one damper via which the device bears towards and against the part, the at least one damper comprising carbon nanotubes covered at least at one of their ends by a layer having a diamond type crystal structure, wherein
   all of the carbon nanotubes are arranged: i) parallel to one another, and ii) in such a manner so that their axes are completely parallel to a direction extending from the device to the part.

11. A vibration damping assembly for use with components of an aircraft, the vibration damping assembly comprising:
   at least one device that the aircraft is configured to use while the aircraft is being operated;
   a support structure; and
   at least one damper which abuts against the support structure, the at least one damper comprising carbon nanotubes covered at least at one of their ends with a layer having a diamond type crystal structure that is in direct contact with at least one of the support structure and the device, wherein
   all of the carbon nanotubes are arranged: i) parallel to one another, and ii) in such a manner so that their axes are completely parallel to a direction extending from the device to the part; and
   the at least one device is made of a material that is different than the diamond type crystal structure.

12. The vibration damping assembly according to claim 11, wherein
   the other ends of the carbon nanotubes are also covered with the layer having the diamond type crystal, and
   the other ends are directly in contact with the at least one device.

13. The vibration damping assembly according to claim 11, wherein the carbon nanotubes are disposed directly below each corner of the at least one device.

14. The vibration damping assembly according to claim 11, further comprising:
   an intermediate support structure disposed between the at least one device and the at least one damper, wherein
   the carbon nanotubes are disposed directly below each corner of the intermediate support structure.

15. The vibration damping assembly according to claim 14, wherein the carbon nanotubes are also disposed in a region substantially midway between each corner of the intermediate support structure.

* * * * *